(12) United States Patent
Yonekawa (10) Patent No.: US 8,814,970 B2
(45) Date of Patent: Aug. 26, 2014

(54) TRAPPING DEVICE THAT TRAPS PARTICLES IN VACUUM ATMOSPHERE

(75) Inventor: Masami Yonekawa, Tsukuba (JP)

(73) Assignee: Canon Kabushiki Kaisha (JP)

(*) Notice: Subject to any disclaimer, the term of this patent is extended or adjusted under 35 U.S.C. 154(b) by 536 days.

(21) Appl. No.: 13/020,357

(22) Filed: Feb. 3, 2011

(65) Prior Publication Data
US 2011/0186082 A1 Aug. 4, 2011

(30) Foreign Application Priority Data

Feb. 4, 2010 (JP) ................................ 2010-022810

(51) Int. Cl.
*B01D 59/50* (2006.01)
*B01D 45/08* (2006.01)
*B08B 5/04* (2006.01)

(52) U.S. Cl.
CPC .. *B01D 45/08* (2013.01); *B08B 5/04* (2013.01)
USPC ............................ 55/385.2; 55/434.2; 55/464

(58) Field of Classification Search
USPC .......................... 55/385.2, 434.2, 464; 134/21
See application file for complete search history.

(56) References Cited

U.S. PATENT DOCUMENTS 3,623,828 A * 11/1971 Shapiro ............................ 417/2
6,781,673 B2 8/2004 Moors et al.

FOREIGN PATENT DOCUMENTS

| JP | 10-302586 A | 11/1998 |
|---|---|---|
| JP | 2002-124463 A | 4/2002 |
| JP | 2007-532435 A | 11/2007 |
| JP | 2008-300806 A | 12/2008 |
| WO | 2005/102870 A2 | 11/2005 |

OTHER PUBLICATIONS

Brach, Raymond M. et al."Models of Rebound and Capture for Oblique Microparticle Impacts" Aerosol Science and Technology, Jan. 1, 1998, pp. 379-388, 29:5, Elsevier Science Inc. Notre Dame IN, USA.
Japanese Office Action for corresponding JP 2010-022810, dated Oct. 29, 2013.

* cited by examiner

*Primary Examiner* — Robert A Hopkins
(74) *Attorney, Agent, or Firm* — Rossi, Kimms & McDowell LLP (57) ABSTRACT

A trapping device that traps a particle in a vacuum atmosphere includes a plurality of grooves arrayed on a surface of the trapping device. Each of the plurality of grooves has a shape that is obtained by replacing a bottom part of a U-groove is replaced with a V-groove.

10 Claims, 6 Drawing Sheets

TRAPPING DEVICE THAT TRAPS PARTICLES IN VACUUM ATMOSPHERE

BACKGROUND OF THE INVENTION

1. Field of the Invention

The present invention relates to a trapping device that traps a particle in a vacuum atmosphere.

2. Description of the Related Art

In order to reduce the size of a pattern of a semiconductor device, an EUV exposure apparatus that exposes a substrate using extreme ultraviolet light (EUV light) as exposure light is developed. With regard to a particle having the size of nanometer order that is generated in the EUV exposure apparatus, its generation cause is not sufficiently resolved, but the operation of the unit along with the slide or the friction maybe the generation cause. Additionally, debris that slightly comes from a light source or the like may be the cause.

Japanese Patent Laid-Open No. 2002-124463 discloses a physical particle trap in an EUV exposure apparatus. A protect plate that constitutes the particle trap has a groove, and a plurality of protrusions are disposed in the groove. Each protrusion has a barb.

However, the physical particle trap of Japanese Patent Laid-Open No. 2002-124463 has an extremely complicated structure, and therefore its manufacturing is difficult. Since the structure is complicated, it is also difficult to obtain sufficient cleanliness in a cleaning process after the manufacturing. Accordingly, the particle trap in itself can be a particle generation source.

SUMMARY OF THE INVENTION

The present invention provides, for example, a trapping device that has a structure advantageous in terms of manufacturing or cleaning thereof.

A trapping device as one aspect of the present invention is a trapping device that traps a particle in a vacuum atmosphere. The trapping device includes a plurality of grooves arrayed on a surface of the trapping device. Each of the plurality of grooves has a shape that is obtained by replacing a bottom part of a U-groove is replaced with a V-groove.

A trapping device as another aspect of the present invention is a trapping device that traps a particle in a vacuum atmosphere. The trapping device includes a plurality of grooves arrayed on a surface of the trapping device. Each of the plurality of grooves has a shape of a regular N-sided pyramid, where N equals 3, 4, or 6.

A vacuum container as another aspect of the present invention includes the trapping device.

A processing apparatus as another aspect of the present invention includes the vacuum container, and the processing apparatus is configured to process a substrate in the vacuum container.

A method of manufacturing a device as another aspect of the present invention includes processing a substrate using the processing apparatus and processing the processed substrate to manufacture the device.

Further features and aspects of the present invention will become apparent from the following description of exemplary embodiments with reference to the attached drawings.

DESCRIPTION OF THE PREFERRED EMBODIMENTS

Exemplary embodiments of the present invention will be described below with reference to the accompanied drawings. In each of the drawings, the same elements will be denoted by the same reference numerals and the duplicate descriptions thereof will be omitted.

[Embodiment 1]

Figure 2:
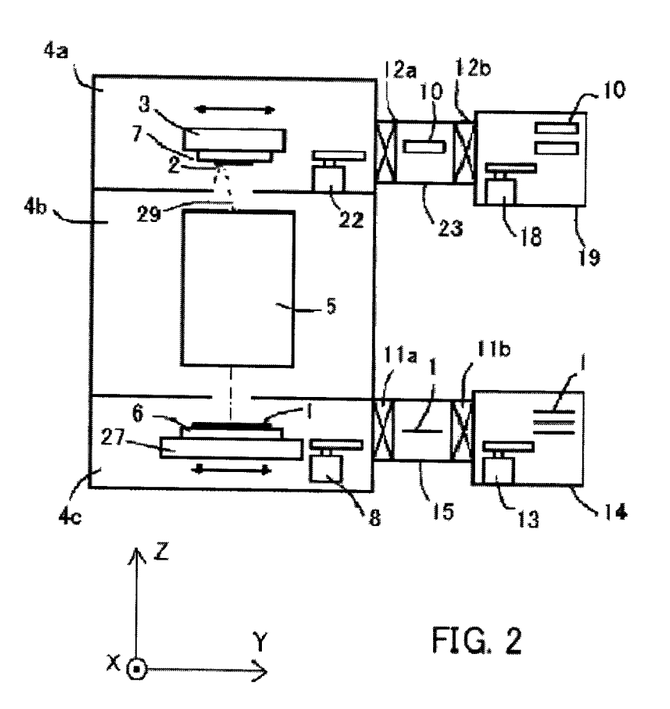
FIG. 2 is a schematic configuration view of an EUV exposure apparatus in Embodiment 1.

First of all, Embodiment 1 of the present invention will be described. FIG. 2 is a schematic configuration view of an EUV exposure apparatus in the present embodiment. The EUV exposure apparatus of the present embodiment has a vacuum container and is configured so as to process a substrate in the vacuum container. Furthermore, the EUV exposure apparatus of the present embodiment includes a trapping device that traps particles in a vacuum atmosphere. The trapping device is configured by arraying a plurality of V-shaped or U-shaped grooves (V-grooves or U-grooves) on its surface. Details of the trapping device will be described below.

A reflective mask 2 (an original plate) on which a circuit pattern is formed is held by a mask chuck 7. The mask chuck 7 holding the mask 2 is mounted on a mask stage 3 capable of performing a coarse positioning and a fine positioning in a scan direction (an arrow direction, or a Y-direction). A projection optical system 5 is configured to project EUV exposure light 29 reflected by the mask 2 onto a wafer 1 (a substrate) to expose the wafer 1.

The wafer 1 is held on a wafer chuck 6. The wafer chuck 6 is mounted on a wafer stage 27 that is capable of performing a coarse positioning and a fine positioning in six axes directions. A position of the wafer stage 27 in X and Y directions is always monitored by a laser interferometer (not shown). In the embodiment, a reduction magnification of the projection optical system 5 is denoted by $1/\beta$, a scan velocity of the mask stage 3 is denoted by Vr, and a scan velocity of the wafer stage 27 is denoted by Vw. Scan operations of the mask stage 3 and the wafer stage 27 are performed by a synchronization control so as to meet the relation of $Vr/Vw=\beta$.

The mask stage 3, the projection optical system 5, and the wafer stage 27 are disposed inside a mask stage space 4a, a projection optical system space 4b, and a wafer stage space 4c, respectively. Each of the mask stage space 4a, the projection optical system space 4b, and the wafer stage space 4c is a vacuum container that is capable of performing a pressure control independently. A trapping device described below is provided inside the vacuum container. A mask load lock chamber 23 or a wafer load lock chamber 15 described below also corresponds to the vacuum container, and the trapping device described below may be provided inside it if necessary.

A mask exchange chamber 19 is connected to the mask stage space 4a via the mask load lock chamber 23. A transfer robot 22 disposed in the mask stage space 4a transfers the mask 2 between the mask stage 3 (the mask chuck 7) and the mask load lock chamber 23. In the mask exchange chamber 19 and the mask load lock chamber 23, the mask 2 is stored in a double pod 10 in order to be protected from the particles, and is removed from the double pod immediately before it is held by the mask chuck 7.

A gate valve 12a is provided between the mask stage space 4a and the mask load lock chamber 23. A gate valve 12b is provided between the mask load lock chamber 23 and the mask exchange chamber 19. The transfer robot 18 disposed in the mask exchange chamber 19 transfers the mask between the mask exchange chamber 19 and the mask load lock chamber 23.

A wafer exchange chamber 14 is connected with the wafer stage space 4c via the wafer load lock chamber 15. A transfer robot 8 disposed in the wafer stage space 4c transfers the wafer 1 between the wafer stage 27 (the wafer chuck 6) and the wafer load lock chamber 15. A gate valve 11a is provided between the wafer stage space 4c and the wafer load lock chamber 15. A gate valve 11b is provided between the wafer load lock chamber 15 and the wafer exchange chamber 14. A transfer robot 13 disposed in the wafer exchange chamber 14 transfers the wafer 1 between the wafer exchange chamber 14 and the wafer load lock chamber 15.

At the time of exposing the wafer 1, EUV exposure light 29 that is supplied from an EUV light source (not shown) is illuminated on the mask 2. The EUV exposure light 29 that is reflected on the mask 2 and that contains pattern information of the mask 2 is projected onto the wafer 1 disposed on the wafer chuck 6 using the projection optical system 5 to expose the wafer 1.

Next, a particle trap plate (a trapping device) of the present embodiment will be described. When a velocity of a particle is slow, the particle is trapped in colliding with a surface since the kinetic energy is small. However, when the velocity exceeds a predetermined threshold velocity, the particle is not trapped to be bounced since the kinetic energy is large. For example, when adopting a PSL (polystyrene latex) ball having a diameter of 1.27 μm and a polished SiO surface, the threshold velocity is around 2 m/s. When the velocity is 5 m/s, a coefficient of restitution is around 0.9. With respect to the phenomenon of rebound of a particle on a plate surface, experimental data in combination with each kind of materials are known (Aerosol Science and Technology, 29:5, 379-388, 1998).

In the simulation of the present embodiment, it is assumed that an initial velocity of the particle is 5 m/s, a pressure is 1E-4Pa, the particle is a PSL having a diameter of 1.27 μm, the surface is a metal surface, and a particle initial condition is that the particle is emitted from a height of 0.1 m in a vertically downward direction. Furthermore, the coefficient of restitution of the particle on the surface is 0.9, and the particle is trapped on the surface when its collision velocity is equal to or slower than a threshold velocity while repeating the bounce on the surface.

Figure 9:
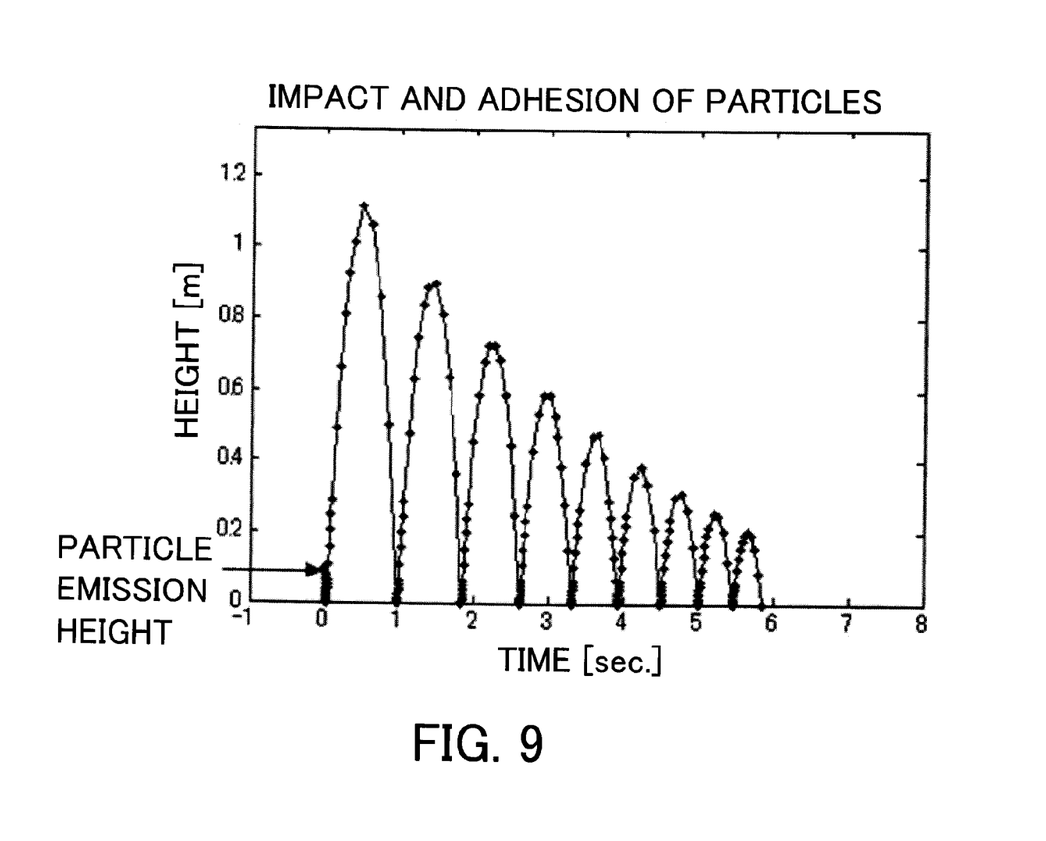
FIG. 9 is a simulation result illustrating a behavior of a particle in Embodiment 1.

FIG. 9 is a simulation result illustrating a behavior of the particle. In FIG. 9, a horizontal axis indicates a time and a vertical axis indicates a height (a position of the particle). The particle emitted from a position of a height of 0.1 m with reference to a surface (a particle emission height) in a vertically downward direction is bounced on the surface and reaches a height equal to or higher than 1 m. Then, the particle repeats collisions with the surface and the kinetic energy is lost, and finally it adheres to the surface. According to the simulation result illustrated in FIG. 9, the particle collides with the surface nearly 10 times to adhere to it.

Since it is assumed that the real particles have various diameters, shapes, or materials, not all phenomena can be explained with such a simulation. However, since a fluid resistance of a gas does not exist in a vacuum, it is considered that the particle adheres to the surface after some collisions in unpredictable directions depending on a generation velocity of the particle.

The trapping device (the EUV exposure apparatus) of the present embodiment eases such a phenomenon of rebound of the particle to suppress the adhesion of the particle to the mask 2 or the wafer 1. Specifically, a V-groove structure is formed on a surface of the trapping device so that the particle incident on the surface collides in the surface structure more than once.

Figure 1:
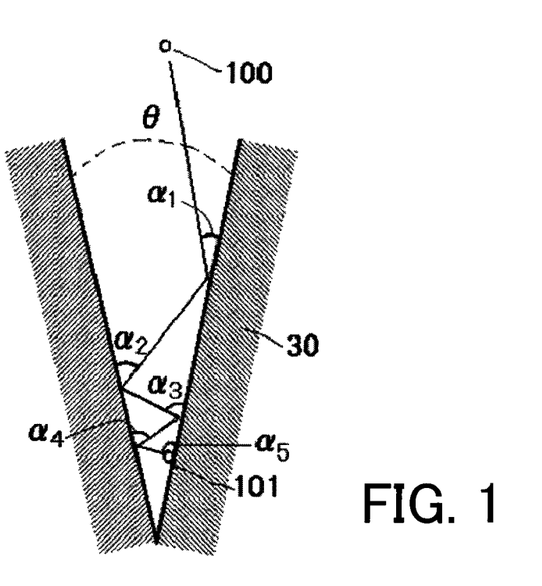
FIG. 1 is an enlarged cross-sectional view of a V-groove that is formed on a surface of a trapping device (an EUV exposure apparatus) in Embodiment 1.

FIG. 1 is an enlarged cross-sectional view of the V-groove formed on the surface of the trapping device (the EUV exposure apparatus) in the present embodiment. In the present embodiment, a cross-sectional structure of a V-groove 30 having an apex angle θ is formed on the surface of the trapping device so that a particle 100 incident on the surface collides inside the V-groove 30 more than once. During the collisions, the particle 100 loses the kinetic energy, and the particle 100 is trapped on the surface inside the V-groove 30 (a particle 101) when the kinetic energy is smaller than an adhesion energy. The particle 101 trapped on the surface once maintains a state of the adhesion to the surface. The particle 100 has a diameter of around 1 to 10 μm.

In FIG. 1, with respect to the particle 100 which is incident on the V-groove 30 in a predetermined direction, an angle with reference to the surface of the V-groove 30 in a first collision is defined as $\alpha_1$. Similarly, angles with reference to the surface of the V-groove 30 in second and later collisions are defined as $\alpha_2, \alpha_3, \alpha_4 \ldots$, respectively (In FIG. 1, angles $\alpha_1$ to $\alpha_5$). Since the particles 100 having various diameters, shapes, or materials exist as particles really generated in a vacuum, a general description for an incidence angle and a reflection angle after the bounce is difficult. In the present embodiment, for easy understanding, it is assumed that the particle 100 incident on the surface of the V-groove 30 at an angle of $\alpha_1$ also maintains the angle of $\alpha_1$ with reference to the surface at the time of the bounce. According to an easy calculation, when an angle with reference to the surface of the V-groove 30 in being incident on the surface i-th time, a recurrence formula that is represented by the following Expression (1) is met.

$$\alpha_{i+1} = 180° - 2\theta + \alpha_i \: (i=1, 2, 3, \ldots n) \quad (1)$$

Considering that the particle 100 collides with the surface of the V-groove 30 more than once, the apex angle θ of the V-groove 30 is set to equal to or smaller than 90 degrees, and more preferably to equal to or smaller than 45 degrees. For example, it is assumed that the apex angle θ is equal to 20 degrees and that the particle 100 is incident on the surface of the V-groove 30 at the angle of $\alpha_1$ that is equal to 30 degrees. In this case, as represented by Expression (1), the angle $\alpha_2$ that is equal to 50 degrees at the time of the second collision and the angle $\alpha_3$ that is equal to 70 degrees at the time of the third collision. Thus, the particle 100 moves to the bottom of the V-groove 30 while repeating the collision on the surface of the V-groove 30, and the kinetic energy is lost and finally the particle 100 adheres to the surface of the V-groove 30.

Figure 3:
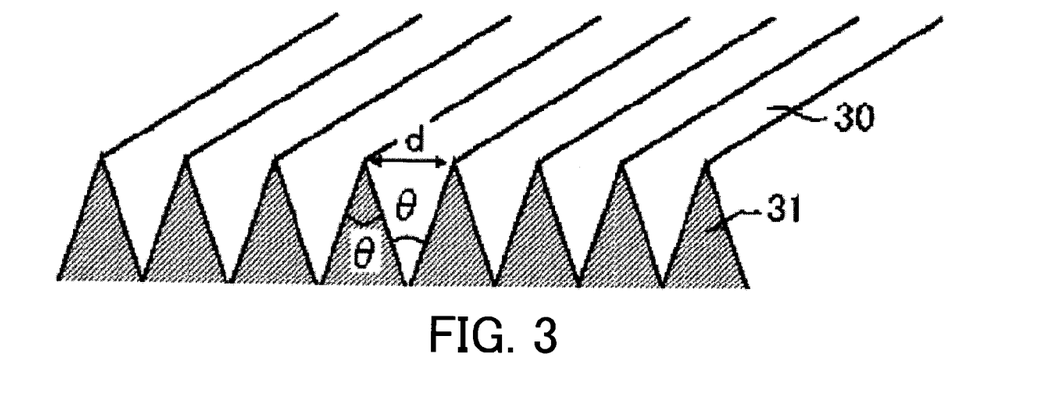
FIG. 3 is a configuration view of a particle trap plate in Embodiment 2.

FIG. 3 is a particle trap plate 31 that is configured by arranging a surface structure of the V-groove 30 illustrated in FIG. 1 periodically in a predetermined direction. A period d of the V-groove 30 is for example set to a period having a size of a millimeter order (for example, around 1 mm) by machining since an inclined surface only has to be formed so that the particle 100 can collide with the surface of the particle trap plate 31 more than once. A surface process of the particle trap plate 31 is finished by polishing such as electrochemical polishing for the machined surface having the apex axis θ and the period d in order to use it in a vacuum. In a vacuum apparatus, generally, depending on a finishing state on a surface of an apparatus wall, water, a contaminant component, or the like is absorbed. As a result, due to a slow vacuum achievement degree or degassing, for example the contaminant component is absorbed on an optical glass. The present embodiment can realize the periodic structure on the surface at a machining size, and a degassing amount per unit area is the same as that of a conventional technology by applying a technology such as electrochemical polishing that has been already established.

Furthermore, the particle trap plate 31 (a plurality of grooves) is cooled using a cooling apparatus (a cooler) that is not shown to be able to improve an effect of trapping the particle 100. The particle 100 has the kinetic energy, and therefore a part of the kinetic energy is converted into a thermal energy when the particle 100 collides with the surface of the particle trap plate 31. Accordingly, the surface of the particle trap plate 31 is cooled to be able to effectively absorb the thermal energy and improve the trapping effect.

When the particle trap plate 31 is cooled, a probability that the trapped particle 100 is removed from the surface of the particle trap plate 31 can also be reduced. In the EUV exposure apparatus (the vacuum container), a phenomenon that a particle is generated when a thermal stimulus is given to a surface of an apparatus is empirically known. With respect to an exhaust gas of the vacuum container, a method of heating a wall of the vacuum container to emit a gas near an inner wall to improve the degree of vacuum is commonly adopted. In particular, when the diameter of the particle is equal to or less than tens nanometer, especially an order of a few nanometer, the absorption phenomenon to the wall and the breakaway phenomenon is predicted to be similar to a behavior of a common gas molecule. Therefore, cooling the particle trap plate 31 is also important in that the breakaway particle is reduced.

In the EUV exposure apparatus of the present embodiment, it is preferable that the particle trap plate 31 is disposed as a baffle plate near an area where a generation of the particle 100 is predicted. Since the particle 100 is generated by a friction or a slide in many cases, and in particular it is preferably disposed near each kind of gate valves, each kind of actuators, each kind of sliding machine element, some of cables, or the like.

According to the present embodiment, even when a particle is generated in a semiconductor manufacturing apparatus (a trapping device, a vacuum container) that operates under a vacuum environment, the adhesion of the particle to the mask or the wafer can be effectively suppressed. In particular, the present embodiment is suitably used for the EUV exposure apparatus.

[Embodiment 2]

Figure 4A:
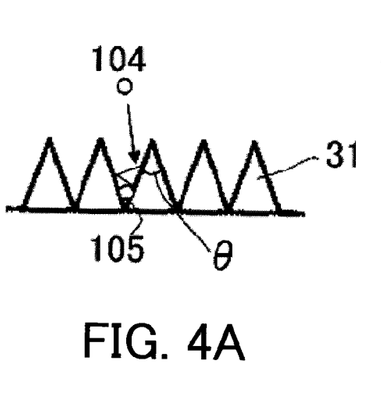
FIGS. 4A and 4B are views illustrating a difference of an incidence angle of a particle with respect to a particle trap plate in Embodiment 2.
Figure 4B:
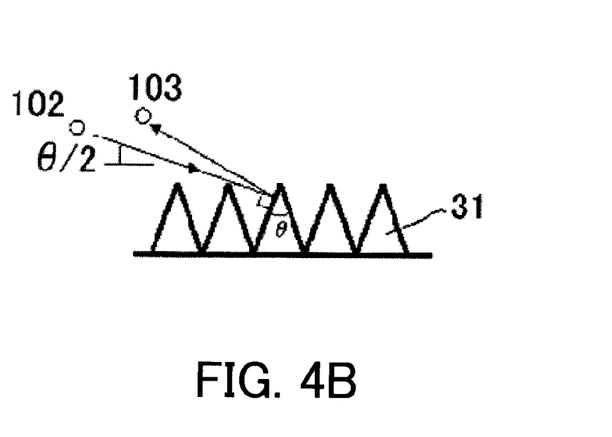

Next, Embodiment 2 of the present invention will be described. The present embodiment has an improved robust trap performance for an incidence angle of a particle with reference to a surface of a particle trap plate. Referring to FIGS. 4A and 4B and FIGS. 5A and 5B, this principle will be described. FIGS. 4A and 4B are views illustrating a difference of the incidence angle of the particle with respect to the particle trap plate 31. In the present embodiment, the apex axis of the V-groove is 20 degrees. In FIG. 4A, with respect to a particle 104 that is incident on the particle trap plate 31 at a deep angle, for example 70 degrees, the angle $α_1$ with reference to the surface of the V-groove is 30 degrees. According to the calculation of a subsequent incidence angle of the particle using Expression (1) described above, the particle moves to the bottom of the V-groove. As a result, due to the principle described above, the particle can be trapped well (a particle 105). On the other hand, as illustrated in FIG. 4B, a particle 102 that is incident on the particle trap plate 31 at a shallow angle, for example 10 degrees may also exist although the probability of the existence is small. In this case, the angle $α_1$ with reference to the surface of the V-groove is 90 degrees, and a case where the particle collides with the surface once and is bounced without being trapped on the surface may occur (a particle 103).

Figure 5A:
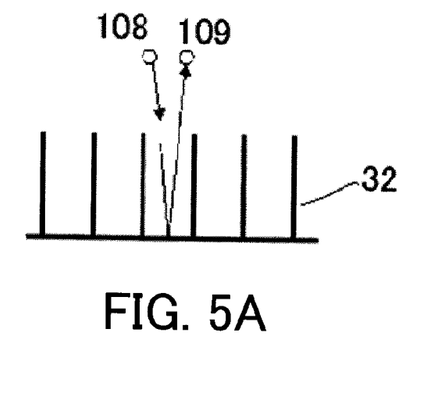
FIGS. 5A and 5B are views illustrating a difference of an incidence angle of a particle with respect to a particle trap plate configured by a parallel plate in Embodiment 2.
Figure 5B:
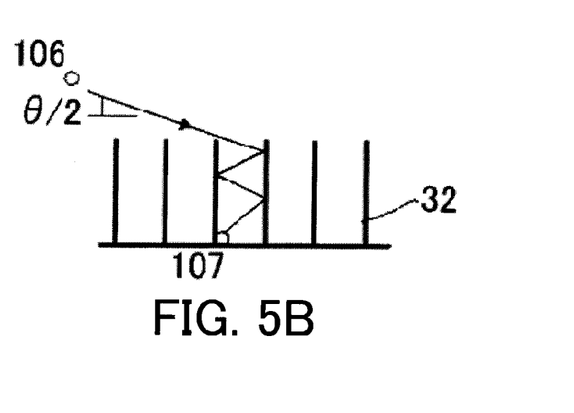

FIGS. 5A and 5B are views illustrating a difference of the incidence angle of the particle with reference to a particle trap plate 32 that is configured by arraying parallel plates periodically. As illustrated in FIG. 5A, when a particle 108 is incident on the particle trap plate 32 at a deep angle, for example 70 degrees, the particle 108 collides with the surface once and then it is bounced (a particle 109). On the other hand, as illustrated in FIG. 5B, a particle 106 that is incident at a shallow angle, for example 10 degrees repeats the collisions between the parallel plates and is finally trapped (a particle 107).

Figure 6:
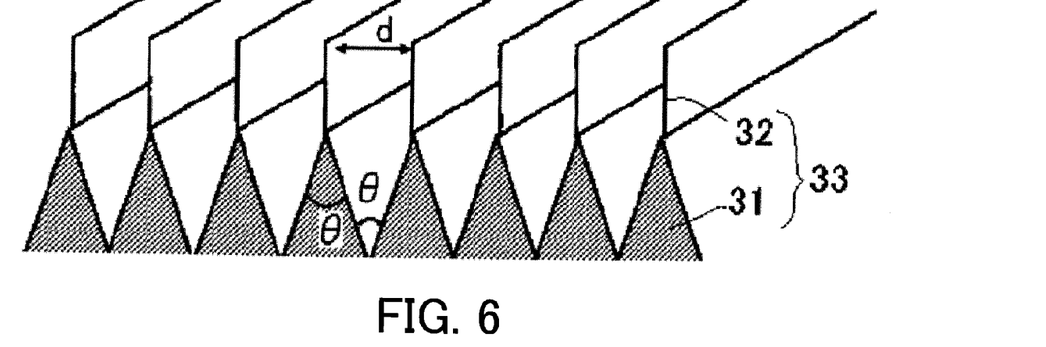
FIG. 6 is a configuration view of another particle trap plate in Embodiment 2.
Figure 10:
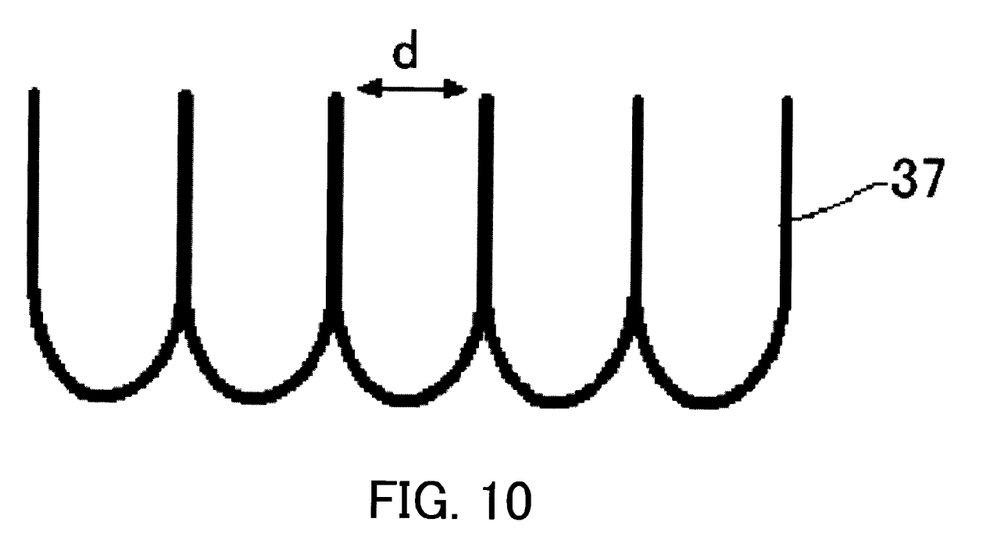
FIG. 10 is a configuration view of another particle trap plate in Embodiment 2.

Thus, the structure of the particle trap plate 31 is advantageous when the particle is incident at a deep angle, and on the other hand, the structure of the particle trap plate 32 is advantageous when the particle is incident at a shallow angle. Combining the structures of these particle trap plates 31 and 32, a more robust structure can be adopted. FIG. 6 is a configuration view of a particle trap plate 33 that is configured by combining the structures of the particle trap plates 31 and 32. As illustrated in FIG. 6, the particle trap plate 33 (each of a plurality of grooves) is configured by combining a groove formed with a parallel plate and a V-shaped groove. As a modified example of such structures, as illustrated in FIG. 10, a particle trap plate 37 that has a U-groove cross-sectional structure can also be adopted. The groove of the structure illustrated in FIG. 6 is included as a "U-shaped groove" and particularly in distinguishing, the groove is referred to as a "U-shaped groove with a V-shaped bottom part".

According to the particle trap plate of the present embodiment, the particle can be effectively trapped for both the particle incident at a deep angle and the particle incident at a shallow angle.

[Embodiment 3]

Figure 7A:
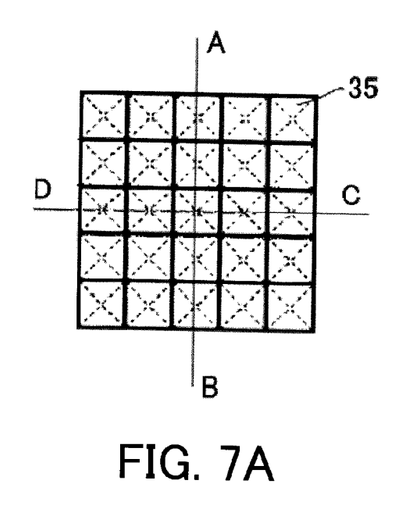
FIGS. 7A and 7B are configuration views of a particle trap plate in Embodiment 3.
Figure 7B:
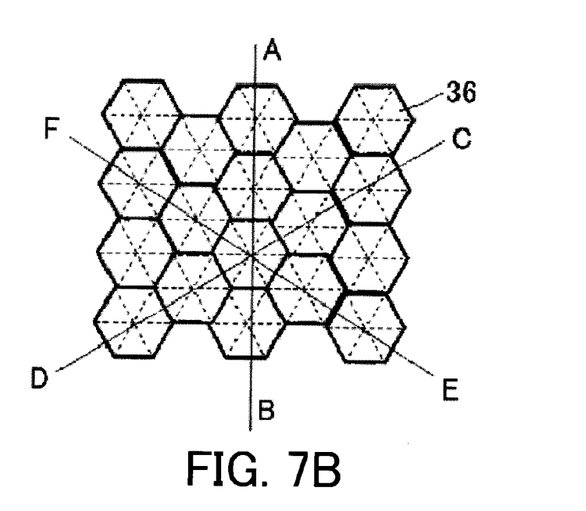

Next, Embodiment 3 of the present invention will be described. The V-groove structures of the cross section is periodically arrayed in one direction in the particle trap plates of Embodiments 1 and 2, however, the present invention is not limited to the structure arrayed in one direction. FIGS. 7A and 7B are configuration views of particle trap plates that are configured by disposing V-groove structures in a two-dimensional direction. FIG. 7A is a particle trap plate 35 that is configured by forming V-groove structures in two directions orthogonal to each other. The particle trap plate 35 is configured by arraying a plurality of grooves each having a shape of a regular four-sided pyramid on a surface two-dimensionally. In FIG. 7A, when each of cross sections of A-B and C-D is viewed, the same V-groove structure as that of embodiments described above is formed. Furthermore, the V-groove structures are formed at a period of 90 degrees in a plane of the particle trap plate 35. In this case, a concave portion on a surface of the particle trap plate 35 has a shape that is formed by inversing the four-sided pyramid. FIG. 7A illustrates a part of the particle trap plate 35, and a real size is appropriately set in accordance with a particle generation source.

FIG. 7B is a particle trap plate 36 that has a hexagonal honeycomb structure. The particle trap plate 36 is configured by arraying a plurality of grooves each having a shape of a regular six-sided pyramid two-dimensionally. In FIG. 7B, when each of cross sections of A-B, C-D, and E-F is viewed, the V-groove structures are formed similarly to the embodiments described above. Furthermore, the V-groove structures are formed at a period of 60 degrees in a plane of the particle trap plate 36. In this case, a concave portion on a surface of the particle trap plate 36 has a shape that is formed by inversing the six-sided pyramid, and the performance of the particle trap can be more robust. FIG. 7B illustrates a part of the particle trap plate 36, and a real size is appropriately set in accordance with a particle generation source.

The particle trap plate of the present embodiment may also be configured by arraying grooves each having a regular three-sided pyramid on a surface two-dimensionally. Thus, in the present embodiment, the plurality of grooves are configured by arraying grooves each having a shape of a regular N-sided pyramid (N=3, 4, or 6) on a surface of a trapping device two-dimensionally.

According to the trapping device (the EUV exposure apparatus) having the particle trap plate of the present embodiment, particles incident in various directions can be effectively trapped.

[Embodiment 4]

Figure 8:
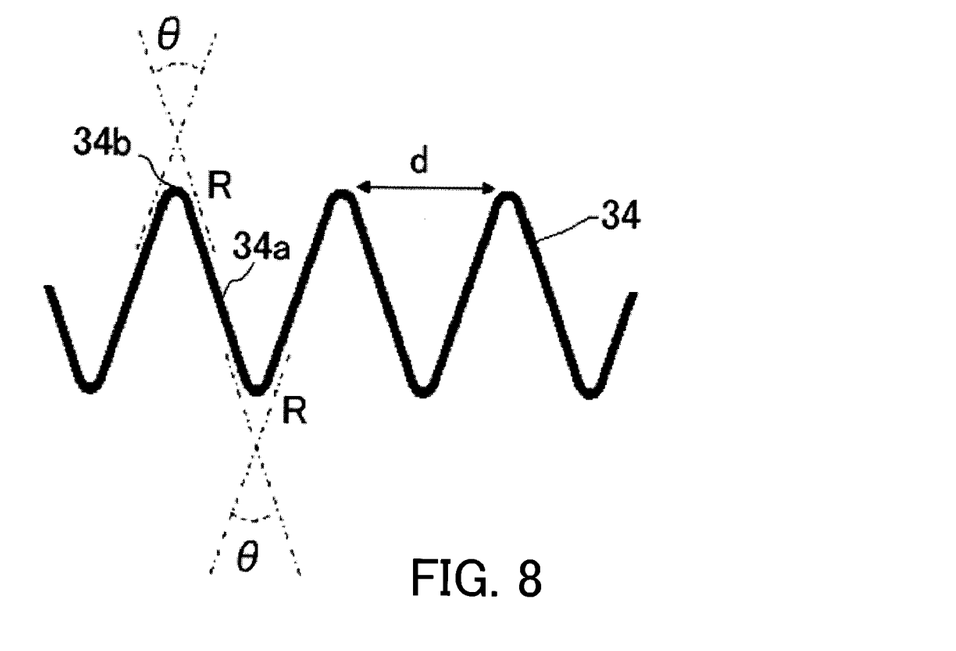
FIG. 8 is a configuration view of a particle trap plate in Embodiment 4.

Next, Embodiment 4 of the present invention will be described. FIG. 8 is a configuration view of a particle trap plate 34 in the present embodiment. As illustrated in FIG. 8, each of a plurality of V-shaped grooves that are formed on the particle trap plate 34 contains an inclined part 34a having a predetermined inclination angle e and an apex part (a bottom part) 34b having a predetermined curvature R. The curvature R is provided in the apex part 34b as the particle trap plate 34 of the present embodiment to improve the stiffness, and therefore the possibility of the damage at the time of the cleaning, the attachment, or the maintenance can be reduced. Therefore, the damage of the apex part of the V-groove structure is suppressed, and it is advantageous to the practical handling.

[Embodiment of device manufacturing method]

Next, a method of manufacturing a device (a semiconductor device, a liquid crystal display device, or the like) of an embodiment of the present invention will be described. In this method, the exposure apparatus (processing apparatus) to which the present invention is applied can be used. The device manufacturing method of the present embodiment includes a first step that processes a wafer (a semiconductor substrate) using the processing apparatus and a second step that processes (fabricates) the processed wafer.

Specifically, the semiconductor device is manufactured by a pre-process that makes an integrated circuit on the wafer (the semiconductor substrate) and a post-process that completes the integrated circuit chip on the wafer manufactured in the pre-processing as a device. The pre-process may include a process that exposes the wafer to which a photosensitizing agent has been applied using the exposure apparatus described above and a process that develops the wafer exposed in the process. The post-process may include an assembly process (dicing, bonding) and a packaging process (encapsulating). The liquid crystal display device is manufactured by a process that forms a transparent electrode. The process that forms the transparent electrode may include a process that applies the photosensitizing agent to a glass substrate, a process that exposes the glass substrate to which the photosensitizing agent has been applied, and a process that develops the glass substrate exposed in the process.

The device manufacturing method of the present embodiment is advantageous to at least one of the performance, productivity, quality, and production cost of the device, compared with conventional one.

Thus, the particle trap plate of each of the above embodiments is applied to a semiconductor manufacturing apparatus such as an EUV exposure apparatus to suppress the adhesion of particles to the mask and the wafer to be able to improve the yield of the device. The particle trap plate of each of the above embodiments can be applied to a processing apparatus, a vacuum container, or the like, that has a problem in which particles may adhere under the vacuum environment, in addition to the semiconductor manufacturing apparatus. Furthermore, at least two of the embodiments may be combined to perform the operation.

According to each of the above embodiments, a trapping device, a vacuum container, a processing apparatus, and a device manufacturing method that are capable of effectively trapping incident particles in various directions can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-022810, filed on Feb. 4, 2010, which is hereby incorporated by reference herein in its entirety.

What is claimed is:

1. A trapping device that traps a particle in a vacuum atmosphere, the trapping device comprising:
   a first structure with a plurality of V-grooves; and
   a second structure with a plurality of parallel plates arranged on the first structure,
   wherein a space between each adjacent pair of plates of the plurality of parallel plates is aligned with one of the plurality of V-grooves.

2. The trapping device according to claim 1, further comprising a cooler configured to cool the first and second structures.

3. The trapping device according to claim 1, wherein each of the plurality of V-grooves has an apex part having a curvature.

4. A trapping device that traps a particle in a vacuum atmosphere, the trapping device comprising:
   a structure with an array of grooves,
   wherein each of the array of grooves has a shape of a regular N-sided pyramid, where N equals 3, 4, or 6.

5. The trapping device according to claim 2, further comprising a cooler configured to cool the structure.

6. The trapping device according to claim 2, wherein each of the array of grooves has an apex part having a curvature.

7. A vacuum container comprising:
   a trapping device that is in the vacuum container and traps a particle in a vacuum atmosphere,
   wherein the trapping device comprises:
   a first structure with a plurality of V-grooves; and
   a second structure with a plurality of parallel plates arranged on the first structure, wherein a space between each adjacent pair of plates of the plurality of parallel plates is aligned with one of the plurality of V-grooves.

8. A vacuum container comprising:
a trapping device that is in the vacuum container and traps a particle in a vacuum atmosphere,
wherein the trapping device comprises:
a structure with an array of grooves,
wherein each of the array of grooves has a shape of a regular N-sided pyramid, where N equals 3, 4, or 6.

9. A processing apparatus comprising:
a vacuum container including a trapping device therein that traps a particle in a vacuum atmosphere,
wherein the trapping device comprises:
a first structure with a plurality of V-grooves; and
a second structure with a plurality of parallel plates arranged on the first structure,
wherein a space between each adjacent pair of plates of the plurality of parallel plates is aligned with one of the plurality of V-grooves, and
wherein the processing apparatus is configured to process a substrate in the vacuum container.

10. A processing apparatus comprising:
a vacuum container including a trapping device therein that traps a particle in a vacuum atmosphere,
wherein the trapping device comprises:
a structure with an array of grooves,
wherein each of the array of grooves has a shape of a regular N-sided pyramid, where N equals 3, 4, or 6, and
wherein the processing apparatus is configured to process a substrate in the vacuum container.

* * * * *